United States Patent [19]
Ames

[11] Patent Number: 5,119,117
[45] Date of Patent: Jun. 2, 1992

[54] LOW SECONDARY COLOR SPECTRUM TRIPLETT

[75] Inventor: Alan J. Ames, Mountainview, Calif.

[73] Assignee: ITT Corporation, New York, N.Y.

[21] Appl. No.: 535,907

[22] Filed: Jun. 11, 1990

[51] Int. Cl.$^5$ .............................................. G02B 9/60
[52] U.S. Cl. .................................................... 359/763
[58] Field of Search ............... 350/465, 474, 438, 439, 350/410, 414

[56] References Cited

U.S. PATENT DOCUMENTS

| | | |
|---|---|---|
| 404,506 | 6/1889 | Schroder . |
| 1,159,233 | 11/1915 | Konig . |
| 1,910,115 | 5/1933 | Luboshez . |
| 1,987,878 | 1/1935 | Tronnier . |
| 2,416,033 | 2/1947 | Warmisham et al. . |
| 2,582,362 | 1/1952 | Taylor . |
| 2,785,602 | 3/1957 | Kohler . |
| 4,919,501 | 4/1990 | Plaot ................................... 350/6.8 |

OTHER PUBLICATIONS

Herzberger, "Dispersion" and Color Correction in Optical Systems, Modern Geometrical Optics, interscience Publisher, Inc., New York, (1958), pp. 108–146.
"Chromatic Aberration", Kingslake, Lens Design Fundamentals, Academic Press, New York, 1978, pp. 73–92.
Military Standardized Handbook, *Optical Design*, MIL-HDBK-141, Oct. 1962), pp. 11-13-11-25.
The Melles-Griot Catalog, pp. 1-12 to 1-15 and 5-10 to 5-14, (1988).

*Primary Examiner*—Bruce Y. Arnold
*Assistant Examiner*—Rebecca D. Gass
*Attorney, Agent, or Firm*—Barnes & Thornburg

[57] ABSTRACT

An objective lens system for use with wavelengths in the visible spectrum, has first and second lens groups. The first lens group has one aplanat lens. The second lens group is a doublet. The second lens group is designed to correct for chromatic aberrations introduced by the first lens group. The power of the second lens group is inversely related to the index of refraction of the first lens group and the optical glasses of the lenses of the second lens group are selected to satisfy a novel color correction equation.

12 Claims, 3 Drawing Sheets

LOW SECONDARY COLOR SPECTRUM TRIPLETT

BACKGROUND AND SUMMARY OF THE INVENTION

This invention relates to telescope optics, and more particularly to an objective lens system for use with wavelengths in the visible spectrum and having an aplanat objective lens group as an objective lens component.

An objective lens system, as the term is used herein, is a lens systems which has two or more lens groups with each lens group having at least one lens. Each lens groups provides a particular function within the objective lens system.

A group of equations have been developed for the design of lens systems, including objective lens systems, and the lens groups therein. These equations are known as the "thin lens" equations Kingslake, Lens Design Fundamentals, Ch. 4, (1978); MIL-HDBK-141.] These equations are:

$$\Phi = \Sigma \phi_i \quad (1)$$

$$\phi_i = (n_i - 1) * cv_i \quad (2)$$

$$\Sigma \frac{\Phi_i}{V_i} = 0 \quad (3)$$

where $\Phi$ is the power of a lens group in the optical system, $\Phi_i$ is the power of an individual lens, $n_i$ is the index of refraction of an individual lens, $cv_i$ is the total curvature of an individual lens, and $V_i$ is the Abbe-V number, discussed below, of the glass of an individual lens. Equation (3) is the primary color correction equation and is used to correct for longitudinal chromatic aberration. Another equation, Equation 16 in MIL-HDBK-141, 11.4.3, is often utilized for correction of secondary color spectrum based on the partial dispersion of the optical glasses of the lenses.

Lenses are fabricated from optical glass. The refractive index of any optical glass or material changes with wavelength. This change, commonly known as dispersion, causes longitudinal chromatic aberration. That is, the focal length of the lens changes with wavelength.

Primary color is an indication of the variation in focal length at two specific wavelengths at the longest and shortest colors used. Since most lenses of optical glasses are used in the visible spectrum by a human observer, the standard convention is to measure primary color at the C-spectral line (a wavelength of 656.27 nm) and the F-spectral line (a wavelength of 486.13 nm). Depending on the exact nature of optical glasses, the focal length of a lens will reach an extreme somewhere within the stated range. If the design of a lens is such that the primary color is zero, the secondary color is a measure of the extent of chromatic aberration over the spectral range of use.

The Abbe-V number is a standard parameter of optical glass which is a function of the indices of refraction of a particular glass at certain wavelength. That is $$V_d = \frac{n_d - 1}{n_F - n_C} \quad (4)$$

where $V_d$ is the Abbe-V number and $n_d$, $n_f$, and $n_c$ are the indices of refraction of the glass at certain wavelengths, i.e. certain colors in the hydrogen emission spectrum. (C=656.27 nm, F=486.13 nm, and d=587.56 nm)

The primary color correction equation, Equation (3), discussed above, is used to set the optical power of the glass used in a lens at the C and F wavelengths. It ensures that the optical power of the glass at the C and F wavelengths is the same so that the image along the longitudinal axis is equal, i.e, at the same place, for these two colors.

Heretofore, glasses in an optical system have commonly been selected by using the Schwartzchild measure equation. This equation, which is the combination of Equations (1) and (2) above rewritten in a slightly different form for a unit focal length, provides $$\Phi = \Sigma \frac{n_i' - n_i}{r_i} h_i = 1 \quad (5)$$

where $n_i$ and $n_i'$ are the indices of refraction before and after the radius of curvature $r_i$, and the height of incidence of the parallel auxiliary ray is denoted with $h_i$, and the index $n_i$ is the surface-number from the first to the rear radius of the system. As implied by the Schwartzchild measure equation, the power of a typical designed lens group is dependent" on the indices of refraction of the materials selected and their curvatures. Since the index of refraction increases at longer wavelengths, it is known that the ideal case is to match their rate of change based on a knowledge of the relative partial dispersion. Alternatively, the primary color correction equation, Equation (3) above, is used to select the glasses. The primary color correction equation, however, expresses essentially the same relationships as the Schwartzchild measure equation but in a different form.

In any event, the approach taken in selecting the glasses in a collimator objective lens system using either the Schwartzchild measure equation or the primary color correction equation assumes that each separate lens group is designed so that chromatic aberrations introduced by one lens within the lens group are corrected by other lenses within that same group. That is, it is assumed that no significant chromatic aberrations are introduced by any lens group that must be corrected by a subsequent lens group.

Collimator objective lens systems are critical parts of larger optical systems such as are used on satellites. Collimators take light from the converging image from the reflective telescope typically used in such optical systems and translate it into parallel wavelengths for distribution to an optical sensor. Without a collimator, the telescope must image directly on the optical sensor. This is impractical in multichannel systems which have an optical sensor for each channel.

Severe packaging constraints are imposed on optical systems used in satellites. For obvious reasons, it is desirable that the optical system used in a satellite be as compact as possible. Principally for this reason, refractive collimators are more desirable than reflective collimators. The most compact optical system can be achieved by using a refractive collimator with a reflective telescope. By refractive collimator, it is meant that refractive lenses are used to make up the collimator.

A refractive collimator typically consists of two or more lens groups. These combined lens groups are designed to correct various well known optical aberrations to provide good optical imaging.

A problem with refractive collimators of the type heretofore used is that alignment is crucial, particularly as the field of view increases. Misalignment of the lenses which make up the refractive collimator causes optical aberrations such as coma, spherical aberration, and astigmatism to increase. If the misalignment is severe enough, the aberrations become large enough that the image is lost. This problem is exacerbated as the field of view increases. Optical aberrations are a function of the field of view and in some cases are powers of the field of view. Consequently, as the field of view increases, so too do the magnitude of optical aberrations. Thus, in systems having a wide field of view, even slight misalignments of the collimator lenses can cause sufficient aberrations so that the image is lost.

Aplanat lenses, which are refractive lenses, are known to be free from the optical aberrations of coma, spherical aberration, and astigmatism. Aplanats produce image magnification but do not produce collimated light. The image magnification produced by the aplanat objective lens permits the power of the other lenses in the collimator to be reduced. This allows for a longer focal length. It would therefore be advantageous to construct a refractive collimator of two or more lens groups But in this case, the first group is the objective lens group which magnifies the image and the second lens group, as well as any subsequent lens groups, collimates the magnified image and corrects for any optical aberrations introduced by the lens groups of the collimator. The longer focal length of this objective lens group permits easier correction of the optical aberrations introduced by individual lenses in the second lens group. Thus, the design of the second lens group is simplified.

Aplanats have been used as the objective lens in a lens system, including a collimator for use in the visible spectrum. In one collimator, a single element aplanat is coupled with an achromatic doublet to form a collimator. However, in this system, the aplanat is assumed not to introduce any chromatic aberrations. This simplistic approach ignores the most basic lens design theory. In another collimator, the first lens group comprises a doublet where one aplanat lens is coupled with another lens to correct any chromatic aberrations and also simulate an aplanat. The technique used to select the glasses in the lens groups of these two collimators is consistent with the standard approach discussed above. That is, each lens group is assumed to produce no chromatic aberrations that must be corrected by a subsequent lens group.

However, aplanats made from optical glasses have significant dispersion in the shorter wavelengths of the visible spectrum although not in the infrared. In other words, aplanats exhibit significant chromatic aberration in the visible spectrum and require significant color correction in the visible spectrum. Aplanats have not seen significant usage in collimators for the visible spectrum due to this chromatic aberration problem. The aplanatic "doublet" discussed above has not proven to be particularly desirable as the objective lens in a visible spectrum collimator since at least three glasses are typically required for the correction of secondary color spectrum. On the other hand, Germanium aplanats have been used as the objective lens in collimators for infrared where they do not exhibit chromatic aberration and thus do not require color correction.

It is an object of this invention to provide a collimator objective lens system for use in the visible spectrum which has one or more single element aplanat lenses making up the objective lens group wherein chromatic aberrations introduced by those the single element aplanat lenses are corrected by the second lens group in the lens system.

It is another object of this invention to provide a visible spectrum collimator having single element aplanat lenses as the objective lens group wherein chromatic aberrations are corrected by a second lens group and the lenses in the second lens group are so designed.

It is another object of this invention to provide a method for selecting the powers and glasses of lenses in a second lens group of a lens system which has one or more single element aplanats as the first lens group to correct the chromatic aberrations produced by the first lens group.

SUMMARY OF THE INVENTION

An objective lens system for use with wavelengths in the visible spectrum in accordance with an embodiment of this invention has first and second lens groups. The first lens group has one aplanat lens. The second lens group is a doublet. The second lens group is designed to correct for chromatic aberrations introduced by the first lens group. The power of the second lens group is inversely related to the index of refraction of the first lens group and the optical glasses of the lenses of the second lens group are selected to satisfy a novel color correction equation.

Additional features and advantages of the invention will become apparent to those skilled in the art upon consideration of the following detailed description of a preferred embodiment, exemplifying the best mode of carrying out the invention as presently perceived. The detailed description particularly refers to the accompanying figures in which:

DETAILED DESCRIPTION OF THE DRAWINGS

This invention makes use of the basic principles described above, but in a different and novel form. This invention provides for at least two lens groups in close proximity. The first group comprises a sequence of single element aplanat lenses whose separation from the focal or image plane is approximately equal to the focal length. The curvatures of these lenses are solely determined by their indices of refraction and their respective thicknesses. It should be understood that this first lens group could comprise a single aplanat lens as well as a sequence of aplanat lenses.

Since the aplanat lenses are free from optical aberrations such as spherical aberration, coma, distortion, and astigmatism, the second lens group need not correct for any of these optical aberrations except those produced within the second lens group itself. However, as discussed, aplanat lenses exhibit chromatic aberration which is significant in the visible spectrum. Thus, the second lens group must be designed to correct for the chromatic aberration introduced by the aplanat first lens group. The approach taken here diverges from the standard approach for selecting the powers and glasses of the second lens group described above. Rather than assuming that each lens group is designed to produce no chromatic aberrations, the optical system of this invention assumes that the single element aplanat lenses of the first lens group do produce chromatic aberrations. The powers and glasses of the second lens group are then selected to correct for the chromatic aberrations produced by the first lens group. In a collimator objective lens system according to this invention, the power of the second lens group is matched to the projected virtual image, that is, the product of the index of refraction of the aplanat lens group and its approximate separation from the desired focal or image plane as described in more detail below.

If an object is located a distance S from an aplanat, it produces a virtual image at a distance n*S on the same side of the lens, where n is equal to the index of refraction of the lens. The physical parameters of the lens are also uniquely determined by these two variables. The radius of the lens closest to the object is equal to S. The radius on the opposing side, assuming a zero lens thickness is equal to:

$$S * \frac{n-1}{n} \quad (6)$$

If a lens with a focal length n*S was placed next to the latter radius, the light would be collimated and the total effective focal length would be equal to S. If the latter lens was an achromatic doublet designed to match the effective dispersion of the first aplanat lens, then the lens as a group would be color corrected.

The inverse of the focal length of the lens is the optical power of the lens, $\phi$. This relationship (for a unit focal length) can be expressed for matching the optical power of the collimator lens group with the magnification of the aplanat as:

$$\frac{1}{n} = \Sigma \phi_i \quad (7)$$

If the first aplanat lens group was made up of more than one aplanat lens, the relationship would be:

$$\pi_j \frac{1}{n_j} = \Sigma \phi_i \quad (8)$$

where $n_j$ are the indices of refraction of the aplanats. On the other hand, the Schwartzchild measure equation, Equation (5) above, would express this relationship in a totally different form as:

$$\Sigma_{i,j} K \Phi_{i,j} = 1 \quad (9)$$

where K is a constant if it is assumed that the parallel auxiliary ray heights at all lens surfaces are equal, a valid assumption for this invention.

The selection of glasses for the lenses can be found using the basic principles described above, which are also described in M. Herzberger, *Modern Geometrical Optics*, (1958), adapted in the novel form described below. The above described basic principles and Herzberger show that for an optical system having a single aplanat lens and a doublet lens, the effective dispersion (1/N) for the doublet is:

$$\frac{\Phi_F - \Phi_C}{\Phi_d} = \frac{1}{N} \quad (10)$$

where F, C, and d are the wavelengths defined above and which are associated with the effective Abbe-V number of the doublet. From above and in accordance with the design approach of this invention, the powers needed for the doublet are determined uniquely by the index of refraction of the aplanat at each wavelength. Thus, Equation (10) will also be approximately equal to:

$$\frac{1}{N} \approx \frac{\frac{1}{n_F} - \frac{1}{n_C}}{\frac{1}{n_d}} \quad (11)$$

The value of 1/N as defined by M. Herzberger for the doublet is determined by the aplanat alone and results in a negative value for all optical materials. Since the dispersion of all optical materials is positive, one might assume a problem exists in finding suitable optical materials for the doublet. Herzberger addresses this point and indicates that the effective Abbe-V number can be made negative through a proper selection of optical materials and powers. The best materials for the aplanats would be those which result in a small negative number, which implies less color correction being provided by the doublet.

The glasses for the doublet can be selected based on the numerators of the above expressions. Applying Herzberger's equation $$\Phi_F - \Phi_C = \sum_1^X \frac{\phi_i}{V_i}, \Phi_D = \sum_1^X \Phi_i \quad (12)$$

to the above expressions, the glasses for the doublet are selected to satisfy the following color correction equation:

$$\Sigma \frac{\Phi_i}{V_i} = \frac{1}{n_F} - \frac{1}{n_C} \quad (13)$$

If there were more than one aplanat in the first lens group, the terms on the right in Equation (12) would be the products of the values of the index of refraction for each aplanat.

Figure 1:
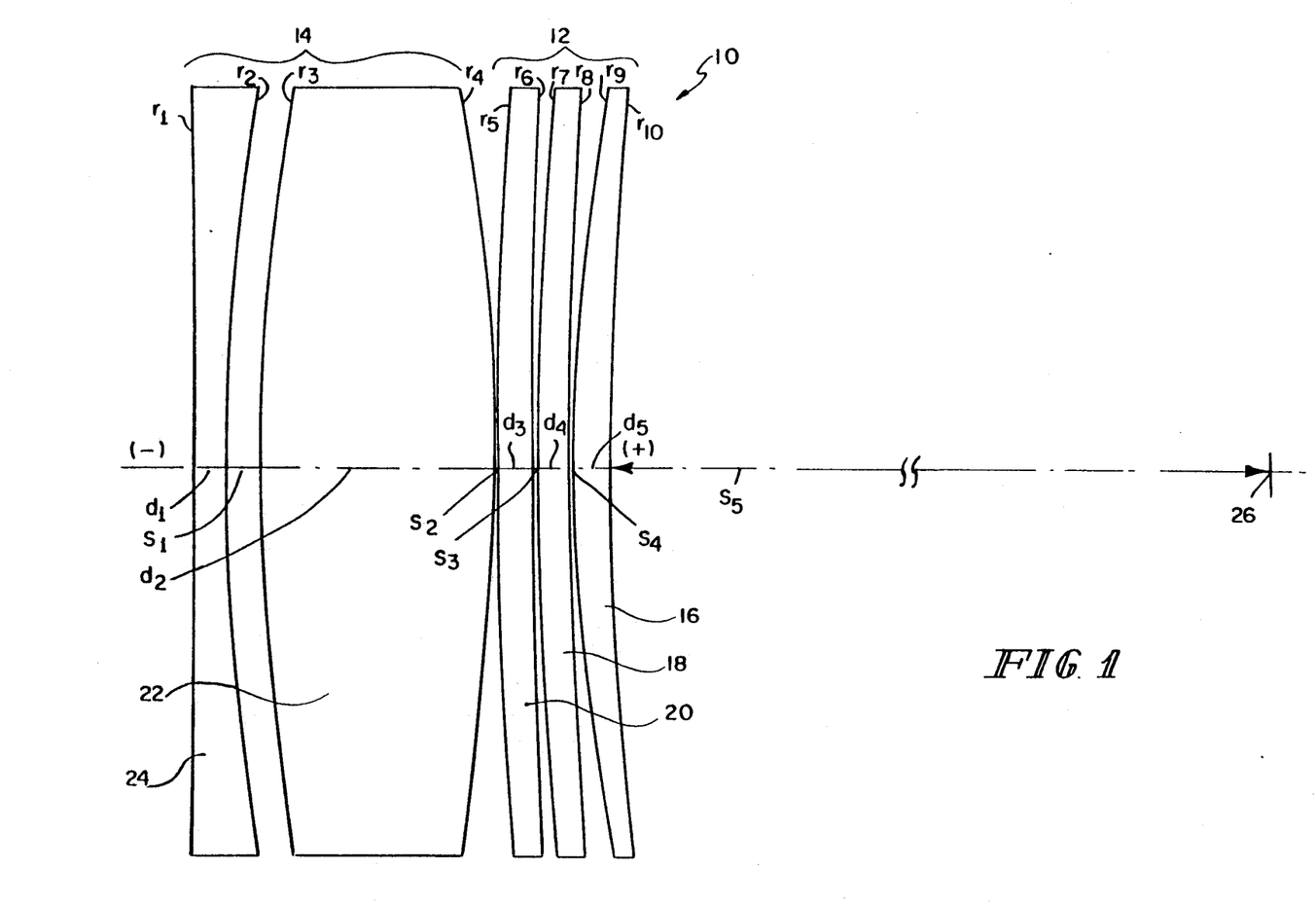
FIG. 1 is a diagrammatic view of an embodiment of a collimator objective lens system according to this invention with a plurality of aplanat lenses making up the objective lens group.

FIG. 1 is an embodiment of an objective collimator lens system 10 according to this invention having three aplanats made from conventional optical glasses making up the objective lens group. Objective collimator lens system 10 is a visible spectrum collimator. Lens system 10 comprises first and second lens groups 12, 14. First lens group 12 has a sequence of single element aplanat lenses 16, 18, 20. First lens group 12 comprises an objective lens in lens system 10. Aplanat lenses 16, 18, 20 of first lens group 12 are designed in conventional fashion for the desired magnification, etc., and essentially without regard to second lens group 14. Second lens group 14 comprises an achromatic doublet having first and second lenses 22, 24. Since first lens group 12 includes more than one single element aplanat lens, then the second lens groups is designed so that the sum of the powers of the second lens group is equal to the inverse product of the indices of refraction of the aplanats in the first lens group. That is:

$$\Sigma \Phi_i = \pi \prod_j \frac{1}{n_j^* s} \quad (14)$$

where $n_j$ is the index of refraction of an individual aplanat lens in the first lens group, s is the back focal length, i.e., the distance from the last surface (surface closest to the image) to a focal point 26. Focal point 26 is the focal point of a telescope (not shown) which provides the image which is transmitted by lens system 10. By including s in the equation, Equation (14) provides a more accurate approximation for selecting the powers of the second lens group than Equation (7) for a unit focal length. By designing the second lens group 14 according to equation (14), a true inverse relationship is introduced between the index of refraction of first lens group 12. This inverse relationship reduces secondary color by a careful selection of optical materials for the aplanat inferred by equation (11). (Secondary color is a measure of the extent of chromatic aberration over the lenses spectral range of use.)

Since the second lens group 14 is designed to correct for the chromatic aberrations introduced by the first lens group 12, the primary color correction equation, Equation (3) above, is not easily applied to select the glasses for the lenses 22, 24 of second lens group 14. A new color correction equation is preferred in selecting the glasses for the lenses of second lens group 14. This equation is:

$$\Sigma \frac{\phi_i}{V_i} = \frac{1}{sn_f} - \frac{1}{sn_c} \quad (15)$$

Color correction Equation (15) is solved for the Abbe-V numbers ($V_i$'s) for the individual lenses, lenses 22, 24 of second lens group 14. Once these Abbe-V numbers are determined, a typical heuristic computer technique is used to fine tune the selection of the glasses and the powers of lenses 22, 24. Color correction Equation (15) provides an approximation for the selection of the glasses for lenses 22, 24 of second lens group 14 which has less than two percent error. Nevertheless, the final selection of the glasses is done heuristically to fine tune the design since the color correction is extended to a wider spectral range.

Table 1 is an illustrative optical prescription for lenses 16, 18, 20, 22, 24 of lens system 10. Lens system 10, as prescribed in Table 1 has a focal length of 0.9766 inches.

TABLE 1

| (all dimensions in inches) | | | | |
|---|---|---|---|---|
| Radii | Thickness or Separation | Material | Index of Refraction | Abbe-V Number |
| $r_1$ −6.195741 | $d_1$ 0.01000 | Schott SF59 | 1.95250 | 20.36 |
| $r_2$ +0.867146 | $s_1$ 0.06479 | Air | | |
| $r_3$ +0.869429 | $d_2$ 0.07000 | Schott PK51 | 1.52855 | 76.96 |

TABLE 1-continued

| (all dimensions in inches) | | | | |
|---|---|---|---|---|
| Radii | Thickness or Separation | Material | Index of Refraction | Abbe-V Number |
| $r_4$ −0.711504 | $s_2$ 0.00100 | Air | | |
| $r_5$ +2.567741 | $d_3$ 0.01000 | Schott SF59 | 1.95250 | 20.36 |
| $r_6$ +3.872846 | $s_3$ 0.00100 | Air | | |
| $r_7$ +1.311380 | $d_4$ 0.01000 | Schott SF59 | 1.95250 | 20.36 |
| $r_8$ +1.973022 | $s_4$ 0.00100 | Air | | |
| $r_9$ +0.667917 | $d_5$ 0.01000 | Schott SF59 | 1.95250 | 20.36 |
| $r_{10}$ +1.00000 | $s_5$ 1.00006 | Air | | |

Figure 2:
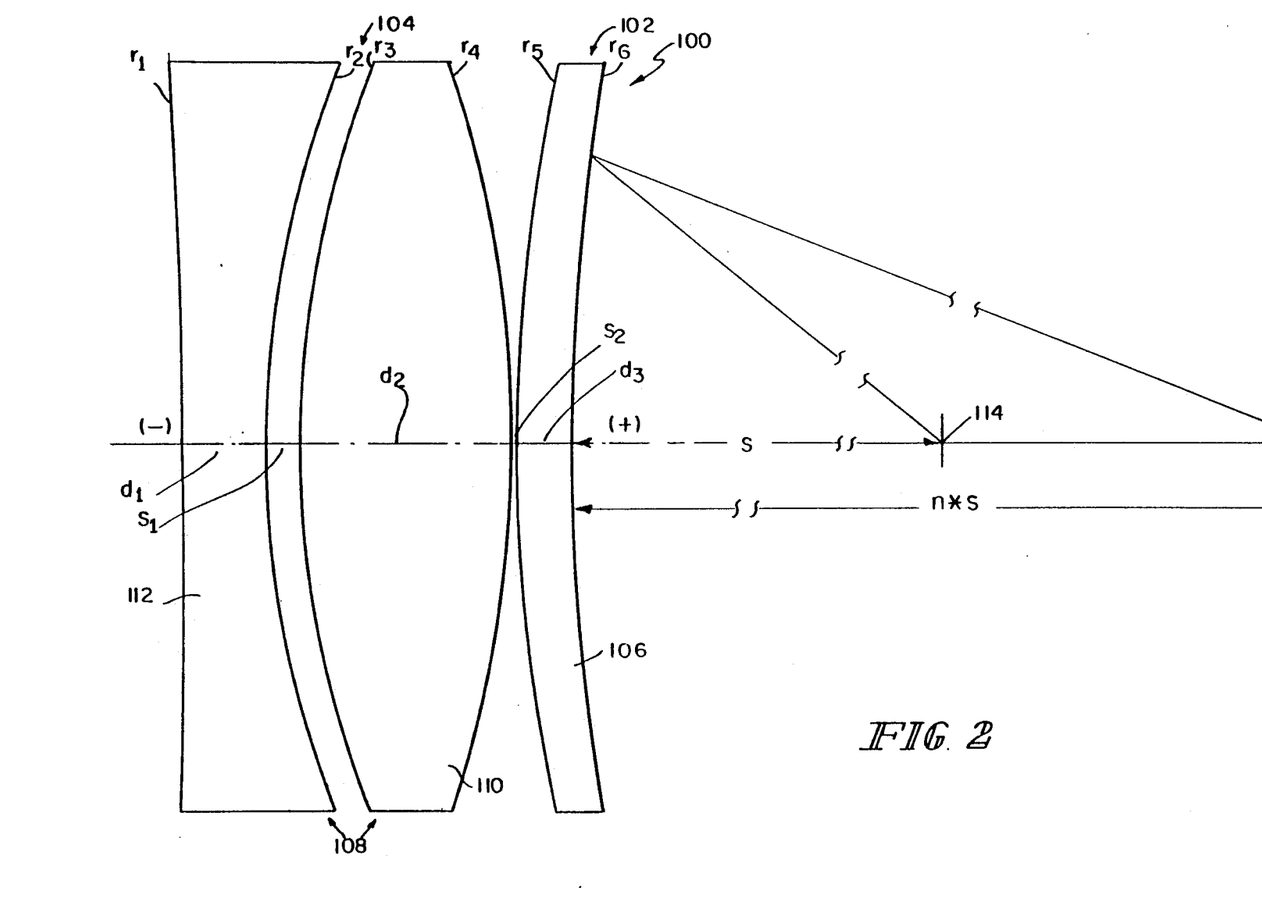
FIG. 2 is a diagrammatic view of a second embodiment of a collimator objective lens system according to this invention with a single aplanat objective lens.

Referring to FIG. 2, the simplest configuration for an objective collimator lens system according to this invention is shown. Objective collimator lens system 100 comprises first and second lens groups 102, 104, which form a triplet based on a single element aplanat objective lens 106 and a chromatic doublet 108. First lens group 102 comprises the single element aplanat lens 106 and second lens group 104 comprises the chromatic doublet 108. Aplanat lens 106 is designed in conventional fashion for the desired magnification, etc., and essentially without regard to second lens group 104. However, Zinc Selenide is used as the optical glass for the aplanat lens 106. The use of Zinc Selenide has great advantage over the use of conventional optical glasses for two important reasons. First, it has a higher index of refraction which permits the use of a single aplanat instead of the three used in the embodiment of FIG. 1. Second, the effective Abbe-V number is a very small negative number as calculated by Equation (11). This simplifies color correction.

Chromatic doublet 108 has two lenses 110, 112. The power of the second lens group 14 is determined by the following equation, which is a simplified version of Equation (14):

$$\Sigma \phi_i = \frac{1}{n^* s} \quad (16)$$

Lens system 100 collimates the image provided at a focal point 114 for further distribution Table 2 is an illustrative embodiment of an optical prescription for lenses 106, 108, 110 of lens system 100 to form a visible spectrum collimator. Lens system 100 as prescribed in Table 2 has a focal length of 4.5898 inches. Both the focal length and back focal length remain quite constant over the desired spectral range of 0.5 microns to 1.65 microns.

TABLE 2

| (all dimensions in inches) | | | | |
|---|---|---|---|---|
| Radii | Thickness or Separation | Material | Index of Refraction | Abbe-V Number |
| $r_1$ −18.62007 | $d_1$ 0.15000 | Schott SF59 | 1.95250 | 20.36 |
| $r_2$ +1.87455 | $s_1$ 0.06479 | Air | | |
| $r_3$ +2.01618 | $d_2$ 0.37500 | Schott PSK53A | 1.62014 | 63.48 |
| $r_4$ −2.10462 | $s_2$ 0.00500 | Air | | |
| $r_5$ | $d_3$ | Zinc | | |

TABLE 2-continued

Figure 3:
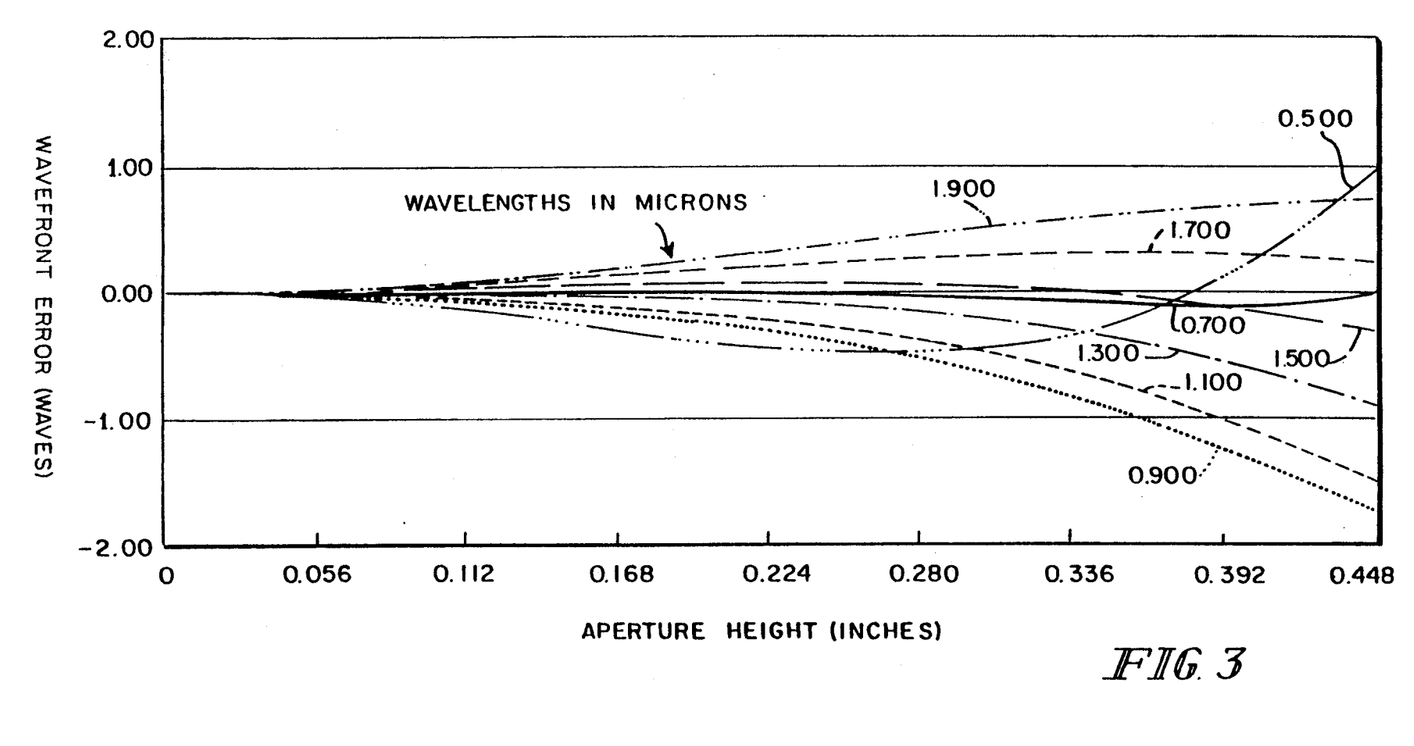
FIG. 3 is a graph showing OPD data at several wavelengths for the collimator objective lens system of FIG. 2.

| | (all dimensions in inches) | | | |
|---|---|---|---|---|
| Radii | Thickness or Separation | Material | Index of Refraction | Abbe-V Number |
| −3.615109 | 0.1500 | Selenide | | |
| $r_6$ 4.90000 | S 4.916452 | Air | | | where the $r_3$ Conic Constant is equal to 0.23133. FIG. 3 is a graph showing OPD data at several wavelengths for lens system 100 of FIG. 2. FIG. 3 illustrates that lens system 100 provides a low secondary color spectrum triplet.

A natural advantage of any lens group near the image (or focal plane) was observed in Konig, U.S. Pat. No. 1,159,233: "If the strongest dispersive compound-surface-pair be placed into the lens-group, which is remote from the eye, the special advantage is obtained that the entering angles of the principal rays do not become too great at this compound-surface-pair and that there is still sufficient over correcting effect for the elimination of distortion and astigmatism." [Konig, U.S. Pat. No. 1,159,233, p1, lines 48–56] This invention, by using single element aplanats with a high index of refraction, transfers this advantage to the second lens group. No correction of spherical aberration, coma, distortion or astigmatism is required other than that produced by surfaces within the second lens group itself.

Visible spectrum collimators in accordance with this invention provide the advantage of being much less sensitive to lateral misalignments By using single element aplanat lenses as the objective lenses in the first lens group of such a collimator, the power of the second lens group in the system can be reduced due to the magnification that can be achieved by using aplanat lenses. This permits a longer focal length which simplifies the design of the second lens group to correct the optical aberrations produced by the individual lenses of the second lens group. Further, the aplanat lenses are less sensitive to lateral misalignment.

Although the invention has been described in detail with reference to certain preferred embodiments and specific examples, variations and modifications exist within the scope and spirit of the invention as described and as defined in the following claims.

What is claimed is:

1. An objective lens system for use with wavelengths in the visible spectrum, comprising
   at least first and second lens groups;
   the first lens group having at least one aplanat lens;
   the second lens group having a plurality of lenses;
   the power of the second lens group determined by the equation $$\Sigma \phi_i = \prod_j \frac{1}{n_j}$$

where $\Phi_i$ is the power of an individual lens in the second lens group and $n_j$ is the index of refraction of an individual aplanat lens in the first lens group; and
   the glasses of the individual lenses of the second lens group selected to satisfy the color correction equation $$\Sigma \frac{\phi_i}{V_i} = \frac{1}{n_f} - \frac{1}{n_c}$$

where $\Phi_i$ is the power of an individual lens in the second lens group, $V_i$ is the Abbe-V number of an individual lens in the second lens group, $n_F$ is the product of the indices of refraction at the F wavelength of the individual aplanats in the first lens group, and $n_c$ is the product of the indices of refraction at the C wavelength of the individual aplanats in the first lens group.

2. The objective lens system of claim 1 wherein the power of the second lens group is determined by the equation $$\Sigma \phi_i = \prod_j \frac{1}{n_j^* s}$$

and the glasses of the individual lenses of the second lens group are selected to satisfy the equation $$\Sigma \frac{\phi_i}{V_i} = \frac{1}{sn_f} - \frac{1}{sn_c}$$

where s is the back focal length of the objective lens system.

3. The objective lens system of claim 2 wherein the first lens group has one aplanat lens and the second lens group comprises a doublet, the objective lens system having the following prescription

| | (all dimensions in inches) ($r_3$ Conic Constant = 0.231334) | | | |
|---|---|---|---|---|
| Radii | Thickness or Separation | Material | Index of Refraction | Abbe-V Number |
| $r_1$ −18.62007 | $d_1$ 0.15000 | Schott SF59 | 1.95250 | 20.36 |
| $r_2$ +1.87455 | $s_1$ 0.06479 | Air | | |
| $r_3$ −2.01618 | $d_2$ 0.37500 | Schott PSK53A | 1.62014 | 63.48 |
| $r_4$ −2.10462 | $s_2$ 0.00500 | Air | | |
| $r_5$ +3.615109 | $d_3$ 0.1500 | Zinc Selenide | | |
| $r_6$ 4.90000 | S 4.916452 | Air | | | where r is the radii of the refractive surfaces, $d_1$ and $d_2$ are the thicknesses of the lenses of the doublet of the second lens group, $d_3$ is the thickness of the aplanat lens of the first lens group, $s_1$ is the air space between the lenses of the doublet of the second lens group, $s_2$ is the air space between the second lens group and the first lens group, and $s_3$ is the air space between the first lens group and the focal point of the objective lens system.

4. The objective lens system of claim 2 wherein the first lens group has three aplanat lenses and the second lens group comprises a doublet, the objective lens system having the following prescription

TABLE 1

| | (all dimensions in inches) | | | |
|---|---|---|---|---|
| Radii | Thickness or Separation | Material | Index of Refraction | Abbe-V Number |
| $r_1$ | $d_1$ | Schott | 1.95250 | 20.36 |

TABLE 1-continued

| | (all dimensions in inches) | | | |
|---|---|---|---|---|
| Radii | Thickness or Separation | Material | Index of Refraction | Abbe-V Number |
| −6.195741 | 0.01000 | SF59 | | |
| $r_2$ +0.867146 | $s_1$ 0.06479 | Air | | |
| $r_3$ +0.869429 | $d_2$ 0.07000 | Schott PK51 | 1.52855 | 76.96 |
| $r_4$ −0.711504 | $s_2$ 0.00100 | Air | | |
| $r_5$ +2.567741 | $d_3$ 0.01000 | Schott SF59 | 1.95250 | 20.36 |
| $r_6$ +3.872846 | $s_3$ 0.00100 | Air | | |
| $r_7$ +1.311380 | $d_4$ 0.01000 | Schott SF59 | 1.95250 | 20.36 |
| $r_8$ +1.973022 | $s_4$ 0.00100 | Air | | |
| $r_9$ +0.667917 | $d_5$ 0.01000 | Schott SF59 | 1.95250 | 20.36 |
| $r_{10}$ −1.00000 | $s_5$ 1.00006 | Air | | | where r is the radii of the refractive surfaces, $d_1$ and $d_2$ are the thicknesses of the lenses of the doublet of the second lens group, $d_3$–$d_5$ are the thicknesses of the first, second, and third aplanat lenses of the first lens group, respectively, $s_1$ is the air space between the lenses of the doublet of the second lens group, $s_2$ is the air space between the second lens group and the first lens group, $s_3$ the air space between the first and second aplanat lenses of the first lens group, $s_4$ is the air space between the second and third aplanat lenses of the first lens group, and $s_5$ is the air space between the third aplanat lens and the focal point of the objective lens system.

5. An objective lens system for use with wavelengths in the visible spectrum, comprising
at least first and second lens groups;
the first lens group comprising one aplanat lens;
the second lens group comprising a doublet;
the power of the second lens group determined by the equation $$\Sigma \phi_i = \frac{1}{n}$$

where $\phi_i$ is the power of an individual lens in the second lens group and n is the index of refraction of the aplanat lens of the first lens group; and
the glasses of the individual lenses of the second lens group selected to satisfy the color correction equation $$\Sigma \frac{\phi_i}{V_i} = \frac{1}{n_f} - \frac{1}{n_c}$$

where $\phi_i$ is the power of an individual lens in the second lens group, $V_i$ is the Abbe-V number of an individual lens in the second lens group, $n_F$ is index of refraction at the F wavelength of the aplanat of the first lens group, and $n_c$ is the index of refraction at the C wavelength of the aplanat of the first lens group.

6. The objective lens system of claim 5 wherein the power of the second lens group is determined by the equation $$\Sigma \phi_i = \Pi \frac{1}{n*s}$$

and the glasses of the individual lenses of the second lens group are selected to satisfy the equation $$\Sigma \frac{\phi_i}{V_i} = \frac{1}{sn_f} - \frac{1}{sn_c}$$

where s is the back focal length of the objective lens system.

7. The objective lens system of claim 5 wherein the aplanat lens of the first lens group is made from Zinc Selenide.

8. The objective lens system of claim 7 wherein the objective lens system has the following prescription

| | (all dimensions in inches) ($r_3$ Conic Constant = 0.231334) | | | |
|---|---|---|---|---|
| Radii | Thickness or Separation | Material | Index of Refraction | Abbe-V Number |
| $r_1$ −18.62007 | $d_1$ 0.15000 | Schott SF59 | 1.95250 | 20.36 |
| $r_2$ +1.87455 | $s_1$ 0.06479 | Air | | |
| $r_3$ +2.01618 | $d_2$ 0.37500 | Schott PSK53A | 1.62014 | 63.48 |
| $r_4$ −2.10462 | $s_2$ 0.00500 | Air | | |
| $r_5$ +3.615109 | $d_3$ 0.1500 | Zinc Selenide | | |
| $r_6$ 4.90000 | S 4.91645 | Air | | | where r is the radii of the refractive surfaces, $d_1$ and $d_2$ are the thicknesses of the lenses of the doublet of the second lens group, $d_3$ is the thickness of the aplanat lens of the first lens group, $s_1$ is the air space between the lenses of the doublet of the second lens group, $s_2$ is the air space between the second lens group and the first lens group, and $s_3$ is the air space between the first lens group and the focal point of the objective lens system.

9. A collimator objective lens system for use with wavelengths in the visible spectrum, comprising
at least first and second lens groups;
the first lens group comprising one aplanat lens;
the second lens group comprising a doublet;
the power of the second lens group determined by the equation $$\Sigma \phi_i = \frac{1}{n}$$

where $\phi_i$ is the power of an individual lens in the second lens group and n is the index of refraction of the aplanat lens of the first lens group; and
the glasses of the individual lenses of the second lens group selected to satisfy the color correction equation $$\Sigma \frac{\phi_i}{V_i} = \frac{1}{n_f} - \frac{1}{n_c}$$

where $\phi_i$ is the power of an individual lens in the second lens group, $V_i$ is the Abbe-V number of an individual lens in the second lens group, $n_F$ is index of refraction at the F wavelength of the aplanat of the first lens group, and $n_c$ is the index of refraction at the C wavelength of the aplanat of the first lens group.

10. The collimator objective lens system of claim 9 wherein the power of the second lens group is determined by the equation $$\Sigma \phi_i = \prod_j \frac{1}{n^* s}$$

and the glasses of the individual lenses of the second lens group are selected to satisfy the equation $$\Sigma \frac{\phi_i}{V_i} = \frac{1}{sn_f} - \frac{1}{sn_c}$$

where s is the back focal length of the objective lens system.

11. The collimator objective lens system of claim 10 wherein the aplanat lens of the first lens group is made from Zinc Selenide.

12. The collimator objective lens system of claim 11 wherein the objective lens system has the following prescription

| | | (all dimensions in inches) ($r_3$ Conic Constant = 0.23133) | | |
|---|---|---|---|---|
| Radii | Thickness or Separation | Material | Index of Refraction | Abbe-V Number |
| $r_1$ −18.62007 | $d_1$ 0.15000 | Schott SF59 | 1.95250 | 20.36 |
| $r_2$ +1.87455 | $s_1$ 0.06479 | Air | | |
| $r_3$ +2.01618 | $d_2$ 0.37500 | Schott PSK53A | 1.62014 | 63.48 |
| $r_4$ −2.10462 | $s_2$ 0.00500 | Air | | |
| $r_5$ +3.615109 | $d_3$ 0.1500 | Zinc Selenide | | |
| $r_6$ 4.90000 | S 4.91645 | Air | | | where r is the radii of the refractive surfaces, $d_1$ and $d_2$ are the thicknesses of the lenses of the doublet of the second lens group, $d_3$ is the thickness of the aplanat lens of the first lens group, $s_1$ is the air space between the lenses of the doublet of the second lens group, $s_2$ is the air space between the second lens group and the first lens group, and $s_3$ is the air space between the first lens group and the focal point of the objective lens system.

* * * * *